United States Patent [19]

Hahne et al.

[11] Patent Number: 5,014,265
[45] Date of Patent: May 7, 1991

[54] METHOD AND APPARATUS FOR CONGESTION CONTROL IN A DATA NETWORK

[75] Inventors: Ellen L. Hahne, Westfield; Charles R. Kalmanek, Hoboken; Samuel P. Morgan, Morris Township, Morris County, all of N.J.

[73] Assignee: AT&T Bell Laboratories, Murray Hill, N.J.

[21] Appl. No.: 443,975

[22] Filed: Nov. 30, 1989

[51] Int. Cl.⁵ .............................................. H04J 3/26
[52] U.S. Cl. ........................................ 370/60; 370/61
[58] Field of Search .................. 370/60, 60.1, 61, 79, 370/80, 94.1, 58.1

[56] References Cited

U.S. PATENT DOCUMENTS

| | | |
|---|---|---|
| Re. 31,319 | 7/1983 | Fraser . |
| 3,749,845 | 7/1973 | Fraser . |
| 4,583,219 | 4/1986 | Riddle . |
| 4,677,616 | 6/1987 | Franklin .............................. 370/94.1 |
| 4,736,369 | 4/1988 | Barzilai et al. . |

OTHER PUBLICATIONS

*IEEE Journal on Selected Areas IN Communications*, No. 5, Nov. 1983, "Towards A Universal Data Transport System", pp. 803–816, by A. G. Fraser.
*IEEE Infocom*, Apr. 1989, "Queueing Disciplines and Passive Congestion Control in Byte-Stream Networks", by S. P. Morgan.
*Computer Networks*, 2nd ed., published by Prentice Hall (1988) pp. 223–239, 287–288, 309–32 by Andrew S. Tanenbaum.

*Primary Examiner*—Douglas W. Olms
*Assistant Examiner*—Melvin Marcelo
*Attorney, Agent, or Firm*—J. W. Herndon; G. E. Nelson

[57] ABSTRACT

A method of controlling congestion in a virtual circuit packet network. A initial packet buffer is assigned to each virtual circuit at each node into which incoming packets are stored and later removed for forward routing. If a larger buffer is desired for a virtual circuit to service a larger amount of data, then additional buffer space is dynamically allocated selectively to the virtual circuit on demand if each node has sufficient unallocated buffer space to fill the request. In one embodiment, the criterion for dynamic allocation is based on the amount of data buffered at the data source. In alternative embodiments, the criteria for dynamic allocation may be further based on the amount of data buffered at each node for a virtual circuit and the total amount of free buffer space at each node of a virtual circuit. Signaling protocols are disclosed whereby data sources and virtual circuit nodes maintain consistent information describing the buffer allocations at all times.

26 Claims, 11 Drawing Sheets

METHOD AND APPARATUS FOR CONGESTION CONTROL IN A DATA NETWORK

TECHNICAL FIELD

The present invention relates to data networks in general and more particularly to protocols, methods and apparatus that improve the flow of information within such networks.

BACKGROUND OF THE INVENTION

Packet-switched networks for the transport of digital data are well known in the prior art. Typically, data are transmitted from a host connecting to a network through a series of network links and switches to a receiving host. Messages from the transmitting host are divided into packets that are transmitted through the network and reassembled at the receiving host. In virtual circuit networks, which are the subject of the present invention, all data packets transmitted during a single session between two hosts follow the same physical network path.

Owing to the random nature of data traffic, data may arrive at a switching node of the network at an instantaneous rate greater than the transmission speed of the outgoing link, and data from some virtual circuits may have to be buffered until they can be transmitted. Various queueing disciplines are known in the prior art. Early data networks typically used some form of first-in-first-out (FIFO) queuing service. In FIFO service, data packets arriving from different virtual circuits are put into a single buffer and transmitted over the output link in the same order in which they arrived at the buffer. More recently, some data networks have used queueing disciplines of round robin type. Such a network is described in a paper by A. G. Fraser entitled, "TOWARDS A UNIVERSAL DATA TRANSPORT SYSTEM," and printed in the IEEE Journal on Selected Areas in Communications, November 1983. Round robin service involves keeping the arriving data on each virtual circuit in a separate per-circuit buffer and transmitting a small amount of data in turn from each buffer that contains any data, until all the buffers are empty. U.S. Pat. No. 4,583,219 to Riddle describes a particular round robin embodiment that gives low delay to messages consisting of a small amount of data. Many other variations also fall within the spirit of round robin service.

First-in-first-out queueing disciplines are somewhat easier to implement than round robin disciplines. However, under heavy-traffic conditions first-in-first-out disciplines can be unfair. This is explained in a paper by S. P. Morgan entitled, "QUEUEING DISCIPLINES AND PASSIVE CONGESTION CONTROL IN BYTE-STREAM NETWORKS," printed in the Proceedings of IEEE INFOCOM '89, April 1989. When many users are contending for limited transmission resources, first-in-first-out queuing gives essentially all of the bandwidth of congested links to users who submit long messages, to the exclusion of users who are attempting to transmit short messages. When there is not enough bandwidth to go around, round robin disciplines divide the available bandwidth equally among all users, so that light users are not locked out by heavy users.

On any data connection it is necessary to keep the transmitter from overrunning the receiver. This is commonly done by means of a sliding-window protocol, as described by A. S. Tanenbaum in the book COMPUTER NETWORKS, 2nd ed., published by Prentice Hall (1988), pp. 223–239. The transmitter sends data in units called frames, each of which carries a sequence number. When the receiver has received a frame, it returns the sequence number to the transmitter. The transmitter is permitted to have only a limited number of sequence numbers outstanding at once; that is, it may transmit up to a specified amount of data and then it must wait until it receives the appropriate sequential acknowledgment before transmitting any new data. If an expected acknowledgment does not arrive within a specified time interval, the transmitter retransmits one or more frames. The maximum number of bits that the transmitter is allowed to have in transit at any given time is called the window size and will be denoted here by W. The maximum number of outstanding sequence numbers is also sometimes called the window size, but that usage will not be followed here.

Suppose that the transmitter and receiver are connected by a circuit of speed S bits per second with a round-trip propagation time $T_0$ seconds, and that they are able to generate or absorb data at a rate not less than S. Let W be the window size. Then, to maintain continuous transmission on an otherwise idle path, W must be at least as large as the round-trip window $W_0$, where $W_0$ is given by $W_0 = ST_0$. $W_0$ is sometimes called the delay-bandwidth product. If the circuit passes through a number of links whose speeds are different, then S represents the speed of the slowest link. If the window is less than the round-trip window, then the average fraction of the network bandwidth that the circuit gets cannot exceed $W/W_0$.

In principle, if a circuit has a window of a given size, buffer space adequate to store the entire window must be available at every queueing point to prevent packet loss in all cases, since forward progress can momentarily come to a halt at the beginning of any link. This is explained in more detail below. On a lightly loaded network, significant delays are unlikely and there can generally be sharing of buffer space between circuits. However, the situation is different when the network is congested. Congestion means that too much traffic has entered the network, even though individual circuits may all be flow controlled. Uncontrolled congestion can lead to data loss due to buffer overflow, or to long delays that the sender interprets as losses. The losses trigger retransmissions, which lead to an unstable situation in which network throughput declines as offered load increases. Congestion instability comes about because whenever data has to be retransmitted, the fraction of the network's capacity that was used to transmit the original data has been lost. In extreme cases, a congested network can deadlock and have to be restarted.

Congestion control methods are surveyed by Tanenbaum, op. cit., pp. 287–88 and 309–320. Many congestion control methods involve the statistical sharing of buffer space in conjunction with trying to sense the onset of network congestion. When the onset of congestion is detected, attempts are made to request or require hosts to slow down their input of data into the network. These techniques are particularly the ones that are subject to congestion instability. Abusive hosts may continue to submit data and cause buffer overflow. Buffer overflow causes packet losses not only of a host submitting the packets that cause the overflow, but also of other hosts. Such packet loss then gives rise to retransmission requests from all users losing packets and it is this effect that pushes the network toward instability and deadlock. Alternatively, as mentioned above, it has been recognized for a long time that congestion instability due to data loss does not occur in a virtual-circuit network, provided that a full window of memory is allocated to each virtual circuit at each queueing node, and provided that if a sender times out, it does not retransmit automatically but first issues an inquiry message to determine the last frame correctly received. If full per-circuit buffer allocation is combined with an intrinsically fair queueing discipline, that is, some variant of round robin, the network is stable and as fair as it can be under the given load.

The DATAKIT (Registered trademark) network is a virtual circuit network marketed by AT&T that operates at a relatively low transmission rate and provides full window buffering for every virtual circuit as just described. This network uses technology similar to that disclosed in U.S. Pat. No. Re. 31,319, which reissued on July 19, 1983 from A. G. Fraser's U.S. Pat. No. 3,749,845 of July 31, 1973, and operates over relatively low-speed T1 channels at approximately 1.5 megabits per second. The DATAKIT network is not subject to network instability because of full-window buffering for each virtual circuit and because data loss of one host does not cause data loss of other users. Dedicated full-window buffering is reasonable for such low-speed channels; however, the size of a data window increases dramatically at speeds higher than 1.5 megabits per second, such as might be used in fiber-optic transmission. If N denotes the maximum number of simultaneously active virtual circuits at a node, the total buffer space that is required to provide a round-trip window for each circuit is $NST_0$. It may be practicable to supply this amount of memory at each node of a low-speed network of limited geographical extent. However, at higher speeds and network sizes, it ultimately ceases to be feasible to dedicate a full round-trip window of memory for every virtual circuit. For example, assuming a nominal transcontinental packet round-trip propagation time of 60 ms, a buffer memory of 11 kilobytes is required for every circuit at every switching node for a 1.5 megabits per second transmission rate. This increases to 338 kilobytes at a 45 megabits per second rate.

A need exists for solutions to the problem of avoiding congestion instability, while at the same avoiding the burgeoning buffer memory requirements of known techniques. It is therefore an overall object of the present invention to retain the advantages of full-window buffering while substantially reducing the total amount of memory required.

It is another object of the invention to reduce the amount of buffering required for each circuit by the sharing of buffer memory between circuits and by dynamic adjustment of window sizes for circuits.

U.S. Pat. No. 4,736,369 to Barzilai et al. addresses some aspects of the problem of adjusting window sizes dynamically during the course of a user session, in response to changes in traffic patterns and buffer availability. However, this patent assumes a network in which flow control and window adjustment are done on a link-by-link basis, that is, as a result of separate negotiations between every pair of adjacent nodes on the path between transmitter and receiver. For high-speed networks, link-by-link flow control is generally considered to be less suitable than end-to-end control, because of the additional computing load that link-by-link control puts on the network nodes.

Thus, it is an another object of the invention to perform flow control on an end-to-end basis with dynamically adjustable windows.

SUMMARY OF THE INVENTION

The invention is a method of controlling congestion in a virtual circuit data network. A data buffer is assigned to each virtual circuit at each node into which incoming data is stored and later removed for forward routing. The size of a buffer for each virtual circuit at a switching node is dynamically allocated in response to signals requesting increased and decreased data window sizes, respectively. If a larger buffer is desired for a virtual circuit to service a larger amount of data, then additional buffer space is dynamically allocated selectively to the virtual circuit on demand if each node has sufficient unallocated buffer space to fill the request. Conversely, the allocated buffer space for a circuit is dynamically reduced when the data source no longer requires a larger buffer size. In one embodiment, the additional space is allocated to a virtual circuit in one or more blocks of fixed size, up to a maximum of a full data window, wherein a full data window is defined as the virtual circuit transmission rate multiplied by a representation of the network round trip propagation delay. In a second embodiment, the additional allocation is done in blocks of variable size.

The size of a block to be allocated at each node of a virtual circuit is determined based on the amount of data waiting to be sent at the packet source, and on the amount of unallocated buffer space at each said node. It may also be based on the amount of data already buffered at each said node.

To perform the additional allocation at each node of a virtual circuit, in a representative embodiment of the invention a first control message is transmitted along a virtual circuit from the first node in the circuit to the last node in the circuit. Each node writes information into the first control message as it passes through describing the amount of unallocated buffer space at the node and the amount of data already buffered at the node. The last node in the virtual circuit returns the first control message to the first node where the size of an allocated block is determined based on the information in the returned first control message. A second control message is then transmitted from the first node to the last node in the virtual circuit specifying the additional space.

DETAILED DESCRIPTION

Figure 1:
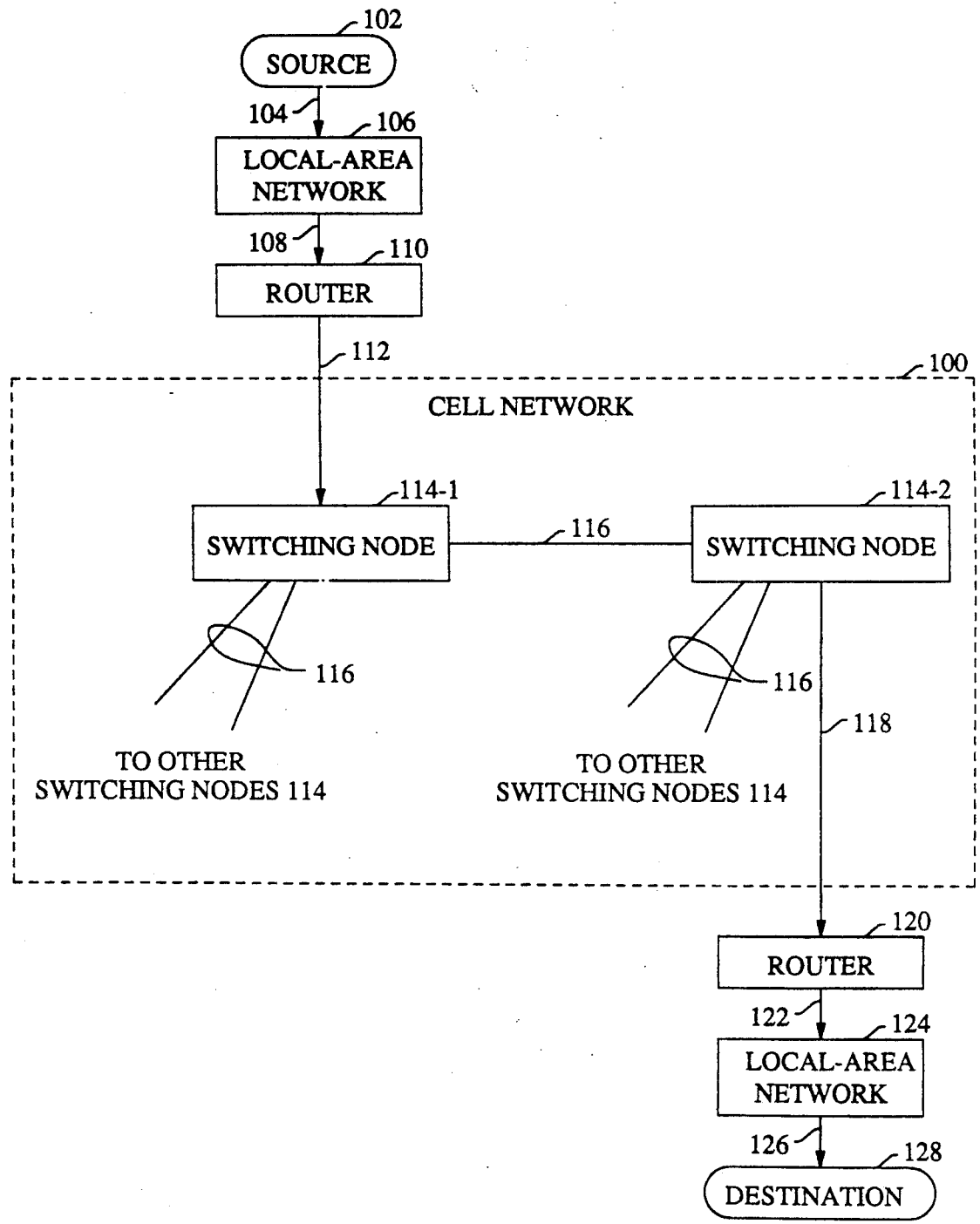
FIG. 1 discloses the architecture of a typical data switching network having a plurality of switching nodes connected to user packet host sources and destinations.

FIG. 1 shows a block diagram of an illustrative packet-switching network. It is assumed that the network interconnects many packet sources and destinations by means of virtual circuits among a number of routers and switching nodes. Packet sources and destinations are attached to local area networks that are on user sites. For example, a source 102 is connected to a local network 106, which is connected to a router 110. One of the functions of the router is to convert between the variable-length data packets issued by the source and the constant-length data cells transmitted and switched by the cell network 100. While cells are considered to be of fixed length, this is not a limitation of the invention. Other functions of the router relevant to the invention will be described below.

The router attaches the local network 106 to the cell network 100 via the access line 108. Data cells belonging to a particular virtual circuit are transmitted through a sequence of switching nodes 114 and data links 116 to an access line 118 that is connected to a router 120. The router 120 reassembles the data cells into data packets addressed to a particular destination, and transmits the packets to the local network 124, from whence they are taken by the destination 128.

It is assumed for purposes of disclosure that the network 100 is similar to the DATAKIT(®) virtual circuit network marketed by AT&T, except that the network 100 operates at a considerably higher transmission rate. That is, it is assumed that network 100 establishes a virtual circuit path between a source router and a destination router via selected ones of the switching nodes 114 when a connection is first initiated. Packets passing from a source to a destination are routed via the virtual circuit for the duration of the connection, although the actual transmission lines and bandwidth on the transmission lines in the path are not dedicated to the connection in question, but might be time-shared among many such connections.

Figure 2:
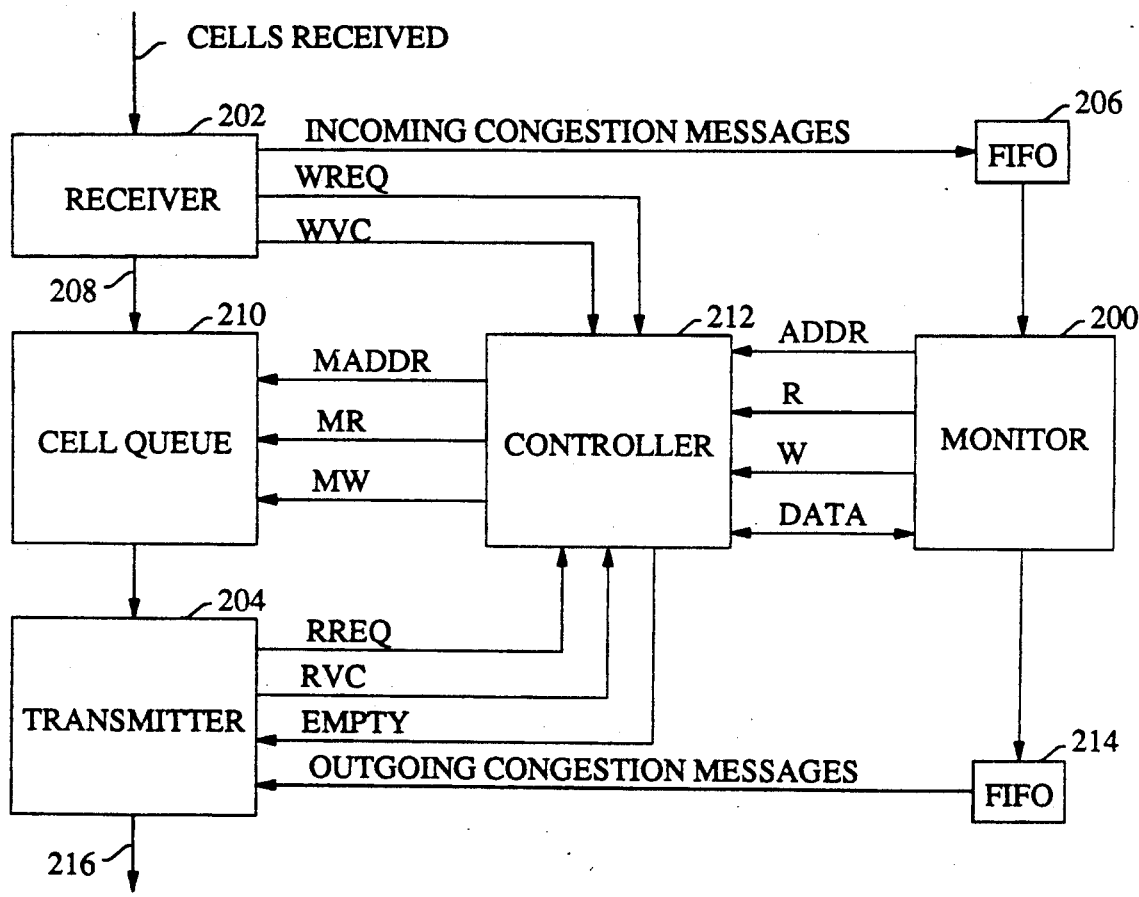
FIG. 2 discloses illustrative details of a data receiving and queuing arrangement at a node for an incoming channel having a plurality of multiplexed time slots corresponding to individual virtual circuits.

In accordance with the invention, FIG. 2 shows an illustrative embodiment of a cell buffering arrangement at a node. This buffering arrangement is able to handle many virtual circuits. Buffer space is allocated per-virtual-circuit and the allocation for a virtual circuit can be changed dynamically, under control of the monitor 200. The monitor is a conventional microprocessor system that is used to implement congestion control mechanisms to be described later. The receiver 202 and transmitter 204 in the figure are conventional, and the transmitter may implement round robin service among the virtual circuits using established techniques.

When a cell arrives, the receiver 202 determines whether the cell is a congestion message as indicated by a bit in the header. Congestion messages are stored in a separate FIFO queue 206 for the monitor. If an arriving cell is not a congestion message, the receiver 202 produces a virtual circuit number on bus WVC and a write request on lead WREQ. The receiver places the cell on its output bus 208 where it is buffered in the cell queue 210 under the control of the controller 212. The cell queue 210 is a memory array of some suitable size, which for the purposes of exposition is organized in words which are one cell wide.

The receiver 202 and the transmitter 204 are autonomous circuits. Each operates independently of the other to enter cells to and remove cells from the cell queue 210, respectively. When the transmitter 204 is ready to send a cell, it produces a virtual circuit number on bus RVC and a read request on lead RREQ. If the allocated buffer in queue 210 associated with virtual circuit RVC is empty, the controller 212 will indicate this condition by setting signal EMPTY to a value of TRUE and the transmitter can try another virtual circuit. Otherwise, the next cell in the buffer associated with RVC will appear on the output bus to be read by the transmitter 204. The controller 212 controls the cell queue via signals on bus MADDR and leads MW and MR. MADDR is the address in the cell queue 210 at which the next cell is to be written or read. MW and MR signify a queue write or read operation, respectively. Congestion messages generated by the monitor 200 are stored in a separate outgoing FIFO 214. These messages are multiplexed with outgoing cells onto the transmission line 216 by the transmitter.

To implement congestion control schemes, the monitor 200 has access to data structures internal to the controller 212 over the buses ADDR, R, W, and DATA. These data structures include the instantaneous buffer length for each virtual circuit and the overall number of cells in the cell queue. Averaging operations required to implement congestion control, according to the protocols described below, are performed by the monitor 200.

Figure 3:
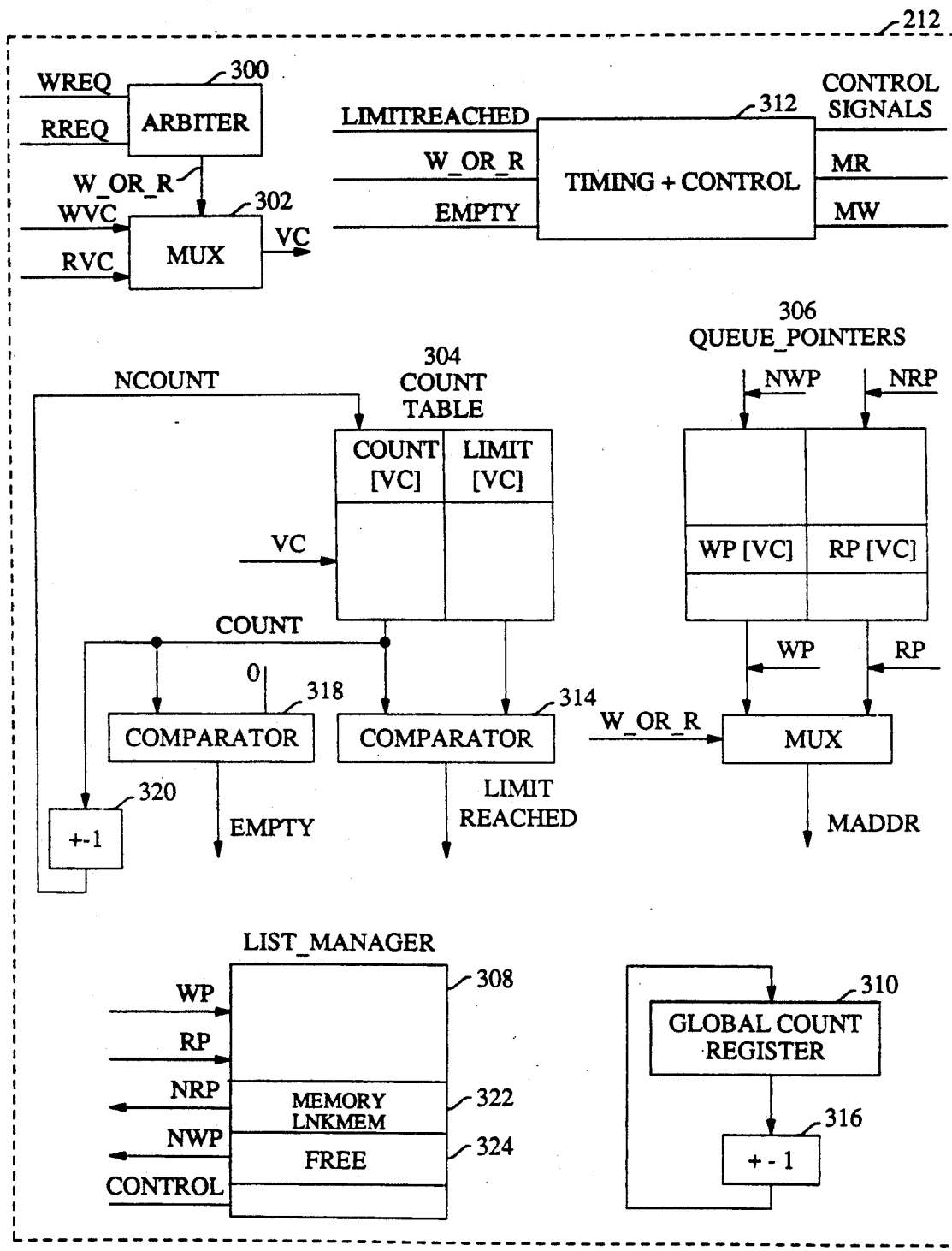
FIG. 3 discloses illustrative details of a controller of FIG. 2 that administers the buffer space allocation and data queuing of virtual circuits on an incoming channel.

FIG. 3 shows illustrative details of the controller 212 of FIG. 2. The major functions of the controller are to keep track of the buffer allocation for each virtual circuit, to keep track of the instantaneous buffer use (buffer length) for each virtual circuit, to manage the allocation of memory in the cell queue such that data can be buffered for each virtual circuit in a dedicated buffer of dynamically varying length, and to control the writing and reading of data in the cell queue as it is received and transmitted. For the purposes of exposition, memory is partitioned in the queue in units of one cell. This section first describes the basic elements of the controller, and then describes the operations of these elements in detail.

An arbiter 300 receives signals WREQ and RREQ, which are requests to write a cell to a buffer associated with a particular virtual circuit or to read a cell from the buffer associated with a particular virtual circuit, respectively. The arbiter insures that read and write operations occur in a non-interfering manner, and that the select input to the multiplexer (W_OR_R) is set such that input RVC is present on bus VC during read operations and input WVC is present on bus VC during write operations. The remainder of this discussion will consider read and write operations separately.

A table COUNT_TABLE 304 is provided for storing the buffer allocation and buffer use for each virtual circuit. The table is addressed with a virtual circuit number on bus VC from the multiplexer 302. Each virtual circuit has two entries in COUNT_TABLE. One entry, LIMIT[VC], contains the maximum number of cells of data that virtual circuit VC is presently allowed to buffer. This, in turn, determines the window size allocated to the virtual circuit. The second entry, COUNT[VC], contains the number of cells that are presently used in the cell queue 210 by virtual circuit VC. The contents of COUNT_TABLE can be read or written by the monitor 200 at any time before or during the operation of the controller 212.

A table QUEUE_POINTERS 306 contains the read and write pointers for the buffer associated with each virtual circuit. Read pointer RP[VC] references the location containing the next cell to be read from the buffer associated with virtual circuit VC; write pointer WP[VC] references the next location to be written in the buffer associated with virtual circuit VC.

Buffers of dynamically varying length are maintained by keeping a linked list of cells for each virtual circuit. The linked lists are maintained by the LIST_MANAGER 308, which also maintains a linked list of unused cells that make up the free buffer space. Operation of the LIST_MANAGER is described below.

A GLOBAL_COUNT register 310 keeps track of the total number of cells in all virtual circuit buffers. If each virtual circuit is initialized with one (unused) cell in its buffer, the initial value of the GLOBAL_COUNT register is equal to the number of virtual circuits. The GLOBAL_COUNT register can be written or read by the monitor. The TIMING+CONTROL circuit 312 supplies all of the control signals needed to operate the controller.

Prior to the start of read request or write operations, the controller is initialized by the monitor. For each virtual circuit, WP[VC] and RP[VC] are initialized with a unique cell number and COUNT[VC] is initialized with a value of 1, representing an empty buffer with one (unused) cell present for receipt of incoming data. The initial value of LIMIT[VC] is the initial buffer allocation for that virtual circuit, which is equivalent to its initial window size. The LIST_MANAGER is initialized such that the free list is a linked list containing all cells in the cell queue 210 except those which are initialized in table QUEUE_POINTERS.

When a cell arrives, the receiver asserts a write request on WREQ and the virtual circuit number on WVC. Bus VC is used to address COUNT_TABLE causing the values in the COUNT[VC] and LIMIT[VC] fields to be sent to a comparator 314. If the virtual circuit in question has not consumed all of its allocated space in the cell queue, i.e. if COUNT[VC] is less than LIMIT[VC] in the table, the comparator will generate a FALSE value on lead LIMITREACHED. Bus VC is also used to address the QUEUE_POINTERS table such that WP[VC] is present on bus MADDR. When LIMITREACHED is FALSE, the timing and control circuit will generate signal MW which causes the cell to be written to the cell queue 210, and will control the LIST_MANAGER to cause a new cell to be allocated and linked into the buffer associated with VC. In addition, the buffer use for VC and the overall cell count values will be updated. To update the buffer use, the present value in COUNT[VC] will be routed via bus COUNT to an up/down counter, which increments the present number of cells recorded in COUNT[VC] by one. This new value, appearing on bus NCOUNT, is present at the input of COUNT_TABLE, and will be written into the table. The overall cell count is incremented in a similar manner using register GLOBAL_COUNT 310 and an up/down counter 316.

If, during a write operation, LIMITREACHED is TRUE, which means that the virtual circuit in question has consumed all of its allocated space in the cell queue, the T+C circuit 312 will not generate signals to write data into the cell queue, to allocate a new cell, or to increment the value of COUNT[VC] or GLOBAL_COUNT. Accordingly, any VC exceeding its assigned window size loses the corresponding cells, but the data for other virtual circuits is not affected.

When the transmitter is ready to send a new cell, it asserts a read request on lead RREQ and the virtual circuit number on bus RVC. COUNT_TABLE is accessed causing the value of COUNT[VC] to be sent to a comparator 318, whose second input is the value zero. If the buffer associated with VC contains no data, the comparator 318 will generate a TRUE signal on EMPTY, and the operation will be terminated by the TIMING+CONTROL circuit 312. If EMPTY is FALSE, the up/down counter 320 will decrement the value of COUNT[VC], and the resulting value will be written into COUNT_TABLE 304. In this case, the value of RP[VC] from QUEUE_POINTERS is present on bus MADDR and the MR signal is generated, reading a cell from the cell queue 210. RP[VC] is also input to the LIST_MANAGER 308 so that the cell can be deallocated and returned to the free store. The address of the next cell in the buffer for VC is present on bus NRP and is written into QUEUE_POINTERS 306. The overall count of cells buffered, which is stored in GLOBAL_COUNT 310, is decremented.

The LIST_MANAGER 308 maintains a linked list of memory locations which make up cell buffers for each virtual circuit. It also maintains a linked list of memory locations which make up the free list. The LIST_MANAGER 308 contains a link memory LNKMEM 322, which contains one word of information for every cell in the cell queue 210. The width of a word in LNKMEM 322 is the logarithm to base 2 of the number of cells in the cell queue 210. There is a register, FREE 324, which contains a pointer to the first entry in the free list.

Consider the buffer for virtual circuit VC. The read pointer RP[VC] points to a location in the cell buffer at which the next cell for virtual circuit VC is to be read by the transmitter. RP[VC] points to a location in LNKMEM 322 which contains a pointer to the next cell to be read from the cell queue 210 and so on. Proceeding in this manner, one arrives at a location in LNKMEM 322 which points to the same location pointed to by WP[VC]. In the cell queue 210 this location is an unused location which is available for the next cell to arrive for VC.

Free space in the cell queue 210 is tracked in LNKMEM 322 by means of a free list. The beginning of the free list is maintained in a register FREE 324 which points to a location in the cell queue 210 which is not on the buffer for any virtual circuit. FREE points in LNKMEM 322 to a location which contains a pointer to the next free cell, and so on.

When a write request occurs for a virtual circuit VC, if VC has not exceeded its buffer allocation, a new cell will be allocated and linked into the buffer associated with VC. The value in WP[VC] is input to the LIST_MANAGER 308 on bus WP at the beginning of the operation. A new value NWP of the write pointer is output by the LIST_MANAGER 308 at the end of the operation. NWP will be written into table QUEUE_POINTERS 306. This occurs as follows:

(1) The value in register FREE 324, which represents an unuse cell, will be chained into the linked list associated with VC, and will also be output as NWP.

NWP=LNKMEM[WP]=FREE (2) The next free location in the free list will be written into FREE 324.

FREE=LNKMEM[FREE]

When a read request occurs for a virtual circuit VC, the cell which is currently being read, namely RP[VC], will be input to the LIST_MANAGER 308 on bus RP to be returned to the free list and the next cell in the buffer associated with VC will be returned as NRP. NRP will be written into table QUEUE_POINTERS 306. This occurs as follows:

(1) A new read pointer is returned which points to the next cell in the buffer associated with VC.

NRP=LNKMEM[RP]

(2) The cell which was read in this cycle is deallocated by linking it into the free list.

LNKMEM[RP]=FREE

FREE=RP

Figure 4:
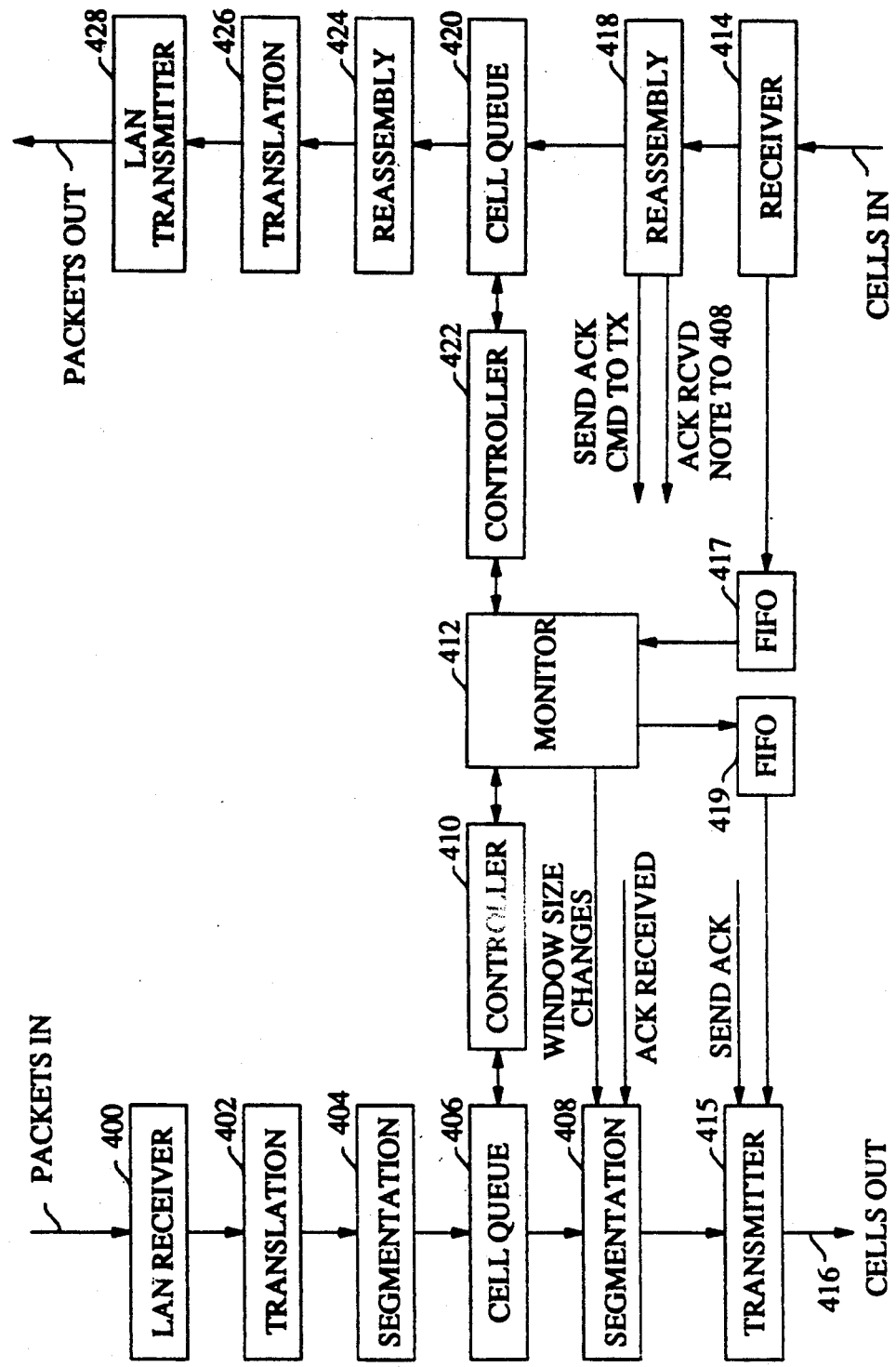
FIG. 4 discloses illustrative details of a router that converts between variable-length data packets from a host and constant-length data cells and further administers the buffer space allocation and data queuing at the router.
Figure 5:
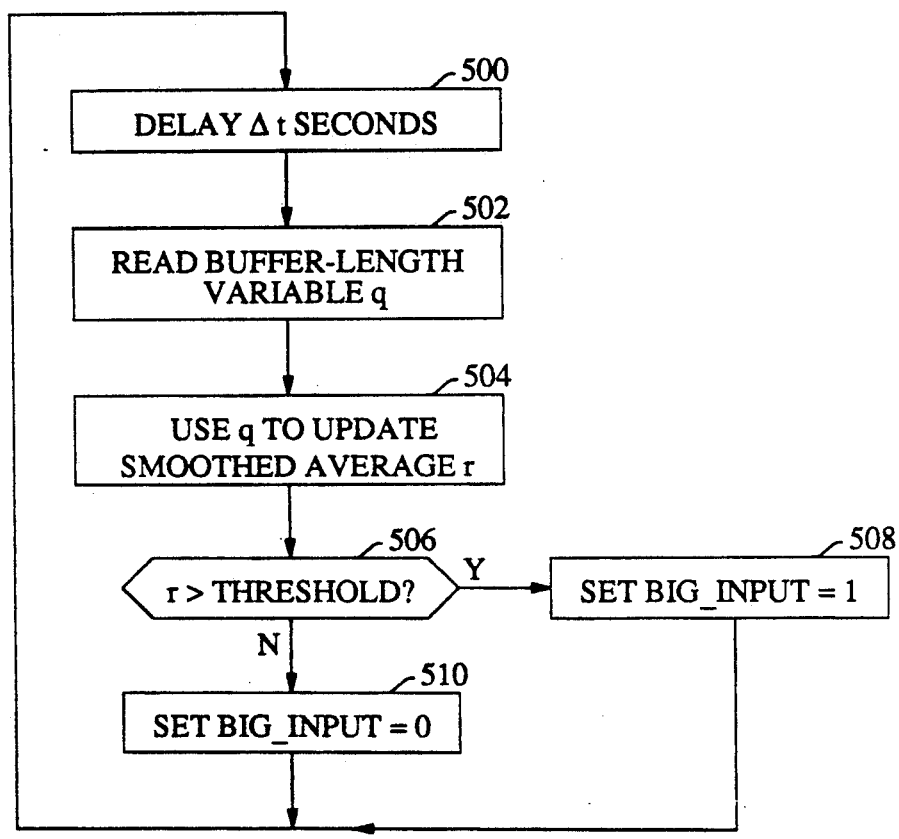
FIG. 5 shows an illustrative method of determining buffer lengths of data for a virtual circuit at a router or switching node.

FIG. 4 is an illustrative embodiment of a router, such as 110 of FIG. 1. Variable length packets arriving from the local area network 106 of FIG. 1 are received by the LAN receiver 400 at the upper left of FIG. 4. A global address, present in each packet, is translated to a virtual circuit number by the translation circuit 402. Since the packet will be transported using fixed length cells that may be smaller or larger than the length of the particular packet under consideration, additional header or trailer bytes may need to be added to the packet to facilitate reassembly of the packet from a sequence of cells which arrive at the destination router, to allow a destination router to exert flow control over a source router, or to allow dropped or misdirected cells to be detected. The resulting information must be padded to a length which is an integral multiple of the cell size. These functions are not pertinent to the invention; however, an illustrative embodiment is described to indicate the relationship of these functions to the congestion management functions that must be performed by the router.

The LAN packet and the virtual circuit number produced by the translation circuit 402 are passed to segmentation circuit 404, which may add header or trailer bytes to the packet, either for the functions described above or as placeholders for such bytes to be supplied by a second segmentation circuit 408. The resulting information is padded to an integral multiple of the cell size and is stored in a cell queue 406, which may be identical in structure to the cell queue 210 described in FIG. 2. In particular, internal data structures in a controller 410 may be accessed by monitor 412 that allow the buffer use (buffer length) to be monitored for each virtual circuit, and that allow the buffer allocation per virtual circuit to be adjusted dynamically. Segmentation circuit 408 performs window flow control on each virtual circuit, where the window size for each virtual circuit may be varied dynamically under the control of the protocols described below. To perform window flow control, segmentation circuit 408 may fill in the added data bytes as appropriate to complete the reassembly and flow control protocol. As a minimum, segmentation circuit 408 maintains a counter per virtual circuit which keeps track of the amount of outstanding, unacknowledged data that it has sent in order to implement window flow control, and it receives acknowledgments from the remote receiver indicating data that has passed safely out of the flow control window. Techniques for implementing reassembly and window flow control are well known in the art; the unique aspect of the invention is that the window sizes and buffer sizes may change dynamically under the influence of congestion control messages. The transmitter 415 takes cells from segmentation circuit 408, from the local receiver as described below, and from the outgoing congestion FIFO 419 and sends them out on the outgoing cell transmission line 416.

Router 110 also receives cells from network 100 via the access line 112 of FIG. 1. These cells arrive at the receiver 414 at the lower right corner of FIG. 4. Insofar as these cells result from packets originated by the source 102 and intended for the destination 128, they will be either congestion messages or acknowledgments from the remote router 120. The handling of cells that may arrive on access line 112 from other sources, which are attempting to communicate with destinations attached to local network 106, will be deferred until the discussion of router 120 below.

When a cell of one of the two types under consideration arrives, the receiver 414 determines whether the cell is a congestion message as indicated by a bit in the header. Congestion messages are stored in a separate FIFO queue 417 for the monitor 412 and handled according to one of the protocols described below. If the protocol generates a further congestion message, an appropriate cell is sent from the monitor 412 to segmentation circuit 408 and multiplexed onto the outgoing cell transmission line 416. If an arriving cell is not a congestion message, the receiver 414 sends the cell to reassembly circuit 418, which determines whether a cell is an acknowledgment from the remote router. If this is the case, reassembly circuit 418 sends an acknowledgment-received notification to segmentation circuit 408, so that it can update the count of the amount of outstanding data.

A router identical in structure with FIG. 4 may also represent element 120 of FIG. 1. In such case, the receiver 414 corresponding to such router takes cells from the outgoing access line 118 of FIG. 1. Insofar as these cells result from packets originated by the source 102 and intended for the destination 128, they will be either data cells or congestion messages from the remote router 110. When a cell arrives, the receiver 414 determines whether the cell is a congestion message as indicated by a bit in the header. Congestion messages are stored in a separate FIFO queue 417 for the monitor 412 and handled according to one of the protocols described below. If the protocol generates a further congestion message, an appropriate cell is sent from the monitor 412 to segmentation circuit 408 and multiplexed onto the outgoing cell transmission line 416 at the lower left of FIG. 4. If an arriving cell is not a congestion message, the receiver 414 sends the cell to reassembly circuit 418, which buffers the arriving cell in a per-virtual circuit buffer in cell queue 420. If the reassembly circuit 418 detects that a complete local area network packet has been accumulated, reassembly circuit 418 sends a send-acknowledgment command to the local transmitter 416 on lead 422, which causes an acknowledgment message to be sent to the remote router 110. In addition, reassembly circuit 418 issues multiple-read requests to the buffer controller 422 causing the cells which make up the packet to be sent in succession to reassembly circuit 424. To facilitate the reassembly procedure, reassembly circuit 424 may delete any header or trailer bytes which were added when the packet was converted to cells by router 110. The packet is then sent to the translation circuit 426, where the global address is translated into a local area network specific address before the packet is sent onto the local area network 124.

CHOICE OF WINDOW SIZES

The operation of the apparatus and protocols described in this invention does not depend on the choice of window sizes. Various practical considerations may determine the window sizes that are used. If there are only two window sizes, the following considerations lead to preferred relationships among the numbers of virtual circuits and the window sizes.

Suppose that the maximum number of virtual circuits that can be simultaneously active at a given node is $N_0$. Suppose further that it is decided to provide some number $N_1$ less than $N_0$ of the virtual circuits with full-size windows $W_0$, while providing the remaining $N_0 - N_1$ virtual circuits with buffers of some smaller size $B_0$ that is adequate for light traffic. If there are $N_1$ simultaneous users each of whom gets an equal fraction of the channel, the fraction of the channel that each gets is $1/N_1$. The maximum fraction of the channel capacity that can be obtained by a user having a window size $B_0$ is $B_0/W_0$. Setting $1/N_1$ equal to the maximum fraction of the trunk that can be had by a user with a small buffer, namely $B_0/W_0$, gives the following relationship among the quantities: $W_0/B_0 = N_1$. The total buffer space B allocated to all the virtual circuits is $$B = (N_0 - N_1)B_0 + N_1 W_0 = N_0 B_0 - W_0 + W_0^2/B_0.$$

Minimizing B with respect to $B_0$ leads to $$B_0 = W_0/(N_0)^{\frac{1}{2}},$$

$$N_1 = (N_0)^{\frac{1}{2}},$$

$$B = [2(N_0)^{\frac{1}{2}} - 1]W_0.$$

These equations provide preferred relationships among $B_0$, $N_1$, $N_0$, and $W_0$.

If there are more than two window sizes, various choices are possible. It may be convenient to choose the sizes in geometric progression, for example, increasing by powers of 2. An alternative approach that may be preferred in some instances is to have different sizes correspond to round-trip windows at various standard transmission speeds. Still other choices may be dictated by other circumstances.

BUFFER ALLOCATION PROTOCOLS

The following discusses protocols by means of which sharable buffer space is allocated and deallocated and by means of which virtual-circuit nodes, routers, and hosts are so alerted. The reader is directed to FIGS. 5 through 12 as required.

Each node controller 212 keeps track of the buffer length of each of its virtual circuits via the entry COUNT[VC] in the table COUNT_TABLE that has been described in connection with FIG. 3. Each node controller also keeps track of the size of its free list, which is the difference between the (fixed) number of cells in the cell queue 210 of FIG. 2 and the contents of the register GLOBAL_COUNT 310 described in connection with FIG. 3. All of these quantities are available to be read at any time by the node monitor 200 shown in FIG. 2. In a similar way, each router keeps track of the input buffer length of each of its virtual circuits, in a table that is available to the router monitor 412 shown in FIG. 4. For purposes of disclosure, it will be assumed that each router manages its cell queue 406, shown on the left side of FIG. 4, in manner similar to the switching nodes, so that quantities analogous to COUNT and GLOBAL_COUNT 310 are available to the router's monitor.

It is unnecessary, but desirable, for the node controllers and the routers to maintain smoothed averages of buffer lengths. A popular smoothing procedure for the time-varying quantity q is given by the easily implementable recursive algorithm, $$r_n = (1-f)q_n + fr_{n-1},$$

where $q_n$ represents the value of q at epoch n, $r_{n-1}$ represents the moving average at epoch $n-1$, $r_n$ represents the moving average at epoch n, and f is a number between 0 and 1 that may be chosen to control the length of the averaging interval. If observations are made at intervals of $\Delta t$ seconds, the approximate averaging interval is $T_{AV}$ seconds, where $$T_{AV} = (1 - 1/\log f)\Delta t.$$

Appropriate averaging intervals for network congestion control may be between 10 and 100 round-trip times.

In various embodiments of the present invention, up to four binary quantities are used with each virtual circuit as indicator of network congestion. These quantities are defined as follows.

BIG_INPUT. A repetitive program at a router is executed periodically (FIG. 5, step 500) to update this parameter. It is set equal to 1 (step 508) for a virtual circuit if a buffer in a cell queue such as 406 for that virtual circuit at the router 110 has been occupied during more than a certain fraction of the time in the recent past, and it is set equal to 0 (step 510) if the buffer has not been occupied during more than that fraction of time. For the determination of BIG_INPUT, the quantity q in the moving-average algorithm (step 504) may be taken as 1 or 0 depending on whether or not any data is found in the buffer at the given observation. The quantity r (step 506) is then an estimate of the fraction of time that the buffer has been occupied during the past $T_{AV}$ seconds. A representative but by no means exclusive threshold for r would be 0.5.

SOME_BACKLOG. This quantity is set equal to 1 for a given virtual circuit at a given node 114 or output router 120 if the virtual-circuit buffer at that node or router has been occupied during more than a certain fraction of the time in the recent past, and it is set equal to 0 otherwise. For the determination of SOME_ BACKLOG, the quantity q in the moving-average algorithm may be taken as 1 or 0 depending on whether or not any data is found in the virtual-circuit buffer at the given observation. The quantity r is then an estimate of the fraction of time that the buffer has been occupied during the past $T_{AV}$ seconds. The flow of control for the monitor program that calculates SOME_BACKLOG is entirely similar to FIG. 5. A representative but by no means exclusive threshold for r would be 0.5. The thresholds for BIG_INPUT and for SOME_BACK-LOG need not be the same.

BIG_BACKLOG. This quantity is set equal to 1 for a given virtual circuit at a given node or output router if the virtual circuit has a large buffer length at the node or router, and is set equal to 0 otherwise. Since the lengths of buffers at bottleneck nodes vary slowly, smoothing of the buffer length is probably unnecessary. The criterion for a large buffer length may depend on the set of window sizes. If the window sizes are related by factors of 2, a representative although not exclusive choice would be to set BIG_BACKLOG equal to 1 if the instantaneous buffer length exceeds 75% of the current window, and equal to 0 otherwise. If the window sizes are equally spaced, a representative choice would be to set BIG_BACKLOG equal to 1 if the instantaneous buffer length exceeds 150% of the spacing between windows, and equal to 0 otherwise.

SPACE_CRUNCH. This quantity is set equal to 1 at given node or output router if the instantaneous number of occupied cells, namely GLOBAL_COUNT 310, at that node or router is greater than some fraction F of the total number of cells in the cell queue 210 or 406 of FIG. 2 or FIG. 4, respectively, and it is set equal to 0 otherwise. A representative choice would be $F = \frac{7}{8}$, although the value of F does not appear to be critical.

Various window management protocols may be embodied using some or all of the congestion indicators defined above. Without limiting the scope of the invention, two embodiments are described below. In each of the two embodiments, each virtual circuit always has a buffer allocation at least as large as the minimum size $B_0$ and it may have other sizes variable up to the limit of a full size window $W_0$. The first embodiment makes use only of the length of a buffer at a data source (a router) and the availability of free queue space at the nodes to manage changes in window size. The second embodiment makes coordinated use of conditions relating to buffer lengths and free queue space at the data source and at all the nodes of the virtual circuit.

In each of the two embodiments, it is assumed that both directions of the virtual circuit traverse exactly the same nodes, and that each node has a single monitor 200 that can read and respond to messages carried by congestion control cells traveling in either direction. If the forward and return paths are logically disjoint, obvious modifications of the protocols can be used. Instead of carrying out some functions on the return trip of a control message, one can make another traverse of the virtual circuit so that all changes are effected by control messages traveling in the forward direction.

Figure 6:
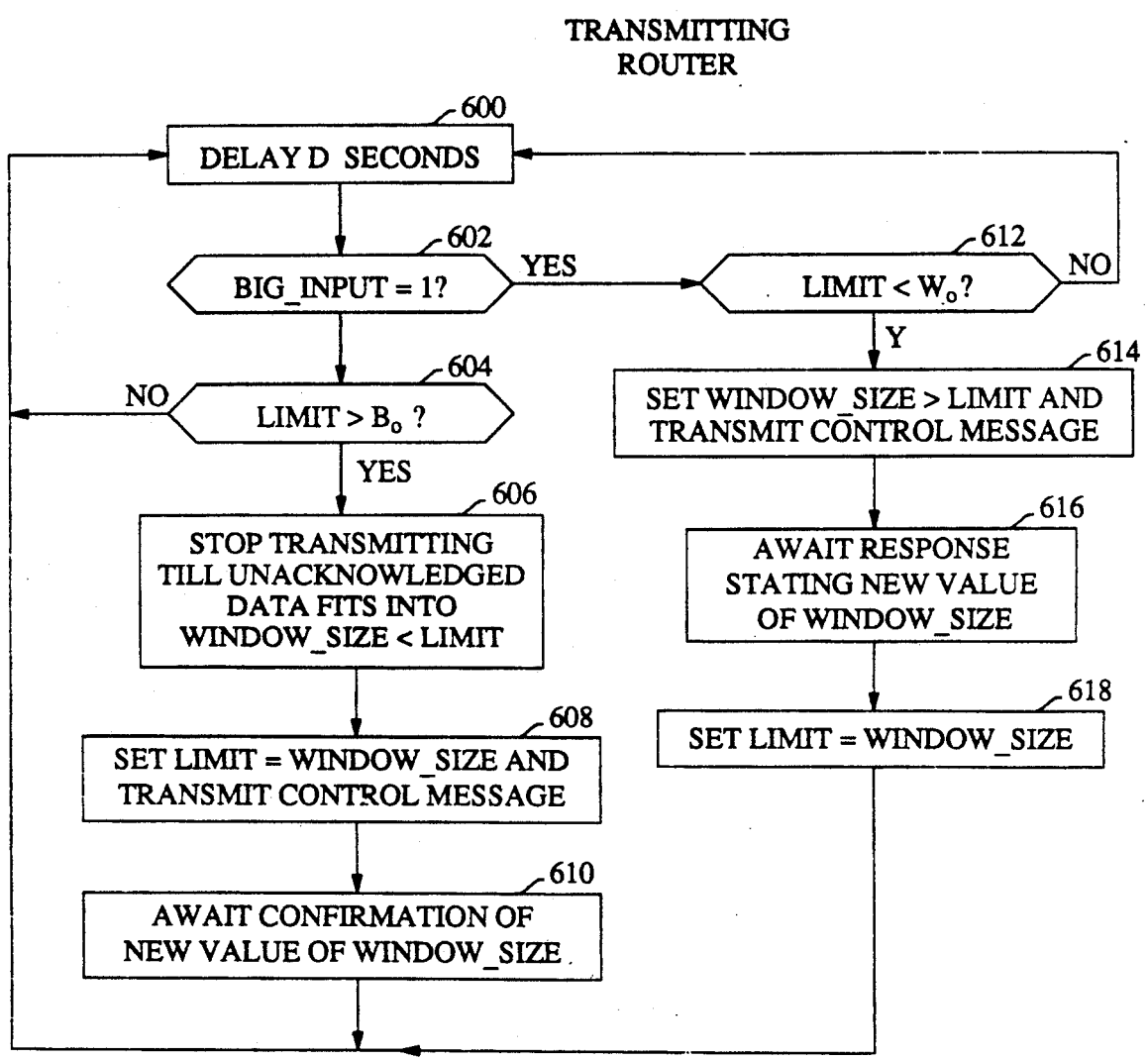
FIGS. 6 and 7 show illustrative flowcharts depicting the protocols and method steps performed at the routers and nodes of dynamically allocating buffer space for a virtual circuit at routers and nodes for an embodiment in which buffer lengths at input routers are used as decision criteria for dynamic buffer allocation.

In the first embodiment, the flow of control in the program that runs in the monitor of the input router 110 is shown schematically in FIG. 6. In FIG. 6, the quantity LIMIT refers to the existing buffer allocation for a particular virtual circuit. The quantity WINDOW_SIZE refers to a proposed new buffer allocation. The input router 110 monitors the quantity BIG_INPUT for each of its virtual circuits (step 602 of FIG. 6). From time to time, as will be described below, it may request a change in the size of the window assigned to a given virtual circuit. It makes such a request by transmitting a control message over the virtual circuit (steps 608 and 614). In the embodiment described here, the message is carried by a special congestion control cell that is identified by a bit in its header. Alternatively, the congestion control message may be carried by special bits in a congestion field in the header of an ordinary data cell, if such a field has been provided. There is no logical difference between the use of special control cells and the use of header fields.

An input router that wishes to change the size of its window transmits a message containing the quantities 0, WINDOW_SIZE. The initial 0 represents a variable called ORIGIN. Messages that carry requests from input routers are distinguished by the value ORIGIN=0; messages that carry responses from output routers have ORIGIN=1, as will appear below. WINDOW_SIZE is the size of the requested window, coded into as many bits as are necessary to represent the total number of available window sizes. By way of example, if there are only two possible sizes, WINDOW_SIZE requires only a single 0 or 1 bit.

An input router that requests a new window size larger than its present window size (steps 612, 614) does not begin to use the new window size until it has received confirmation at step 616 (as described below. On the other hand, a router does not request a window size smaller than its current allocation until it has already begun to use the smaller window (step 606). Since switch nodes can always reduce buffer allocations that are above the initial window size, confirmation of a request for a smaller window is assured.

When the node controller 212 of a switching node along the forward path receives a control message containing 0, WINDOW_SIZE, it processes the message as follows. If the node controller can make the requested buffer allocation it does so, and passes the message to the next node without change. If there is insufficient unallocated space in the free list to meet the request, the node allocates as large a buffer size as it can, the minimum being the current buffer size. In either case, the controller writes the value of WINDOW_SIZE that it can allow into the message before passing it along to the next node. The output router also meets the requested value of WINDOW_SIZE as nearly as it can, sets ORIGIN=1 to indicate a response message, and transmits the response containing the final value of WINDOW_SIZE to the first switching node on the return path. Node controllers on the return path read ORIGIN=1 and the WINDOW_SIZE field and adjust their allocations accordingly. The adjustments involve, at most, downward allocations for nodes that met the original request before some node failed to do so. When the input router receives a control message containing 1, WINDOW_SIZE, it knows that a set of buffer allocations consistent with the value WINDOW_SIZE exist along the whole path.

A newly opened virtual circuit has a buffer allocation $B_0$ at each node and has a window of size $B_0$. The input router should request an increase in window size as soon as it observes that BIG_INPUT=1. After requesting a window change and receiving a response, the input router may wait for some period of time D, such as 10 to 100 round-trip times, before inspecting BIG_INPUT again. Then if BIG_INPUT=1, it may ask for another increase in window size, or if BIG_INPUT=0, it may ask for a decrease. If a decrease is called for, the input router does not issue the request until the amount of outstanding data on the virtual circuit will fit into the smaller window, and from that time on it observes the new window restriction. The actual allocation is not changed until the value of LIMIT is set equal to the value of WINDOW_SIZE (steps 608, 618).

Figure 7:
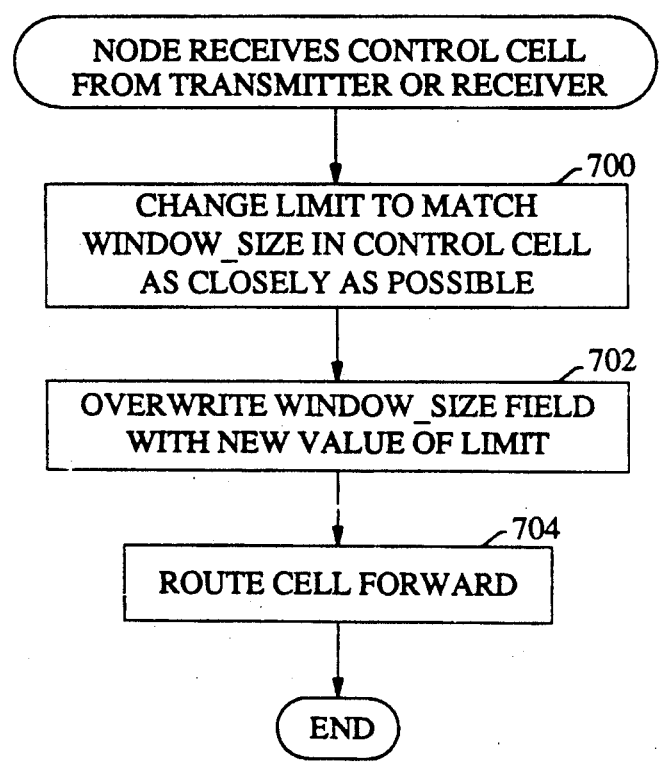

The flow of control in the program that runs in the monitor of a switching node 114, in response to the arrival of a congestion control cell from either direction, is depicted in FIG. 7. Step 700 changes LIMIT to match the requested window size as closely as possible. Step 702 writes the new value of LIMIT into the control cell and passes the message along to the next node in the virtual circuit.

The previous embodiment has made use only of congestion information at the input router. A second embodiment employs a protocol that coordinates congestion information across the entire circuit in order to pick a new window size if one is needed. It uses a two-phase signaling procedure, in which the first phase sets up the new window and the second phase resolves any discrepancies that may exist among the new window and the buffer allocations at the various nodes. The logical steps carried out by the input and output routers and by the switching nodes are illustrated schematically in FIGS. 8 through 12.

Figure 8:
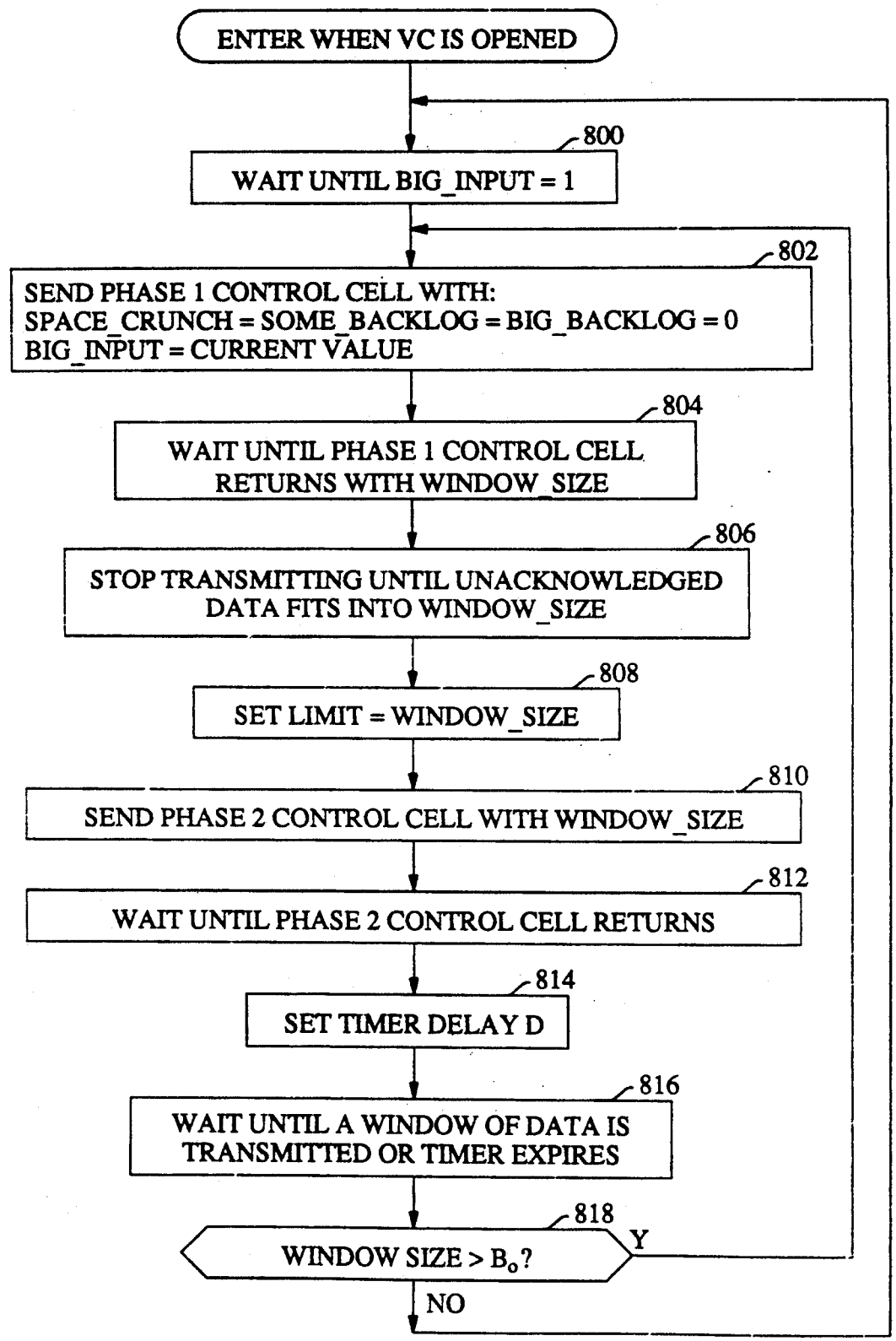
FIGS. 8 through 12 disclose flowcharts depicting the protocols and method steps performed at the routers and nodes for allocating buffer space in blocks of fixed or varying sizes to virtual circuits in an embodiment in which buffer lengths at nodes are used in conjunction with buffer lengths at routers as decision criteria.

The protocol for the second embodiment uses the quantities ORIGIN, BIG_INPUT, SOME_BACKLOG, BIG_BACKLOG, and SPACE_CRUNCH that were defined earlier. Since the protocol uses two phases of signaling, it requires one extra binary quantity, PHASE, which takes the value 0 for Phase 1 and 1 for Phase 2. In Phase 1, the input router 110 initiates a control message carrying a 6-bit field that consists of the quantities ORIGIN=0, PHASE=0, BIG_INPUT, SPACE_CRUNCH=0, SOME_BACKLOG=0, BIG_BACKLOG=0. The flow of control for the input router is depicted in FIG. 8.

Figure 9:
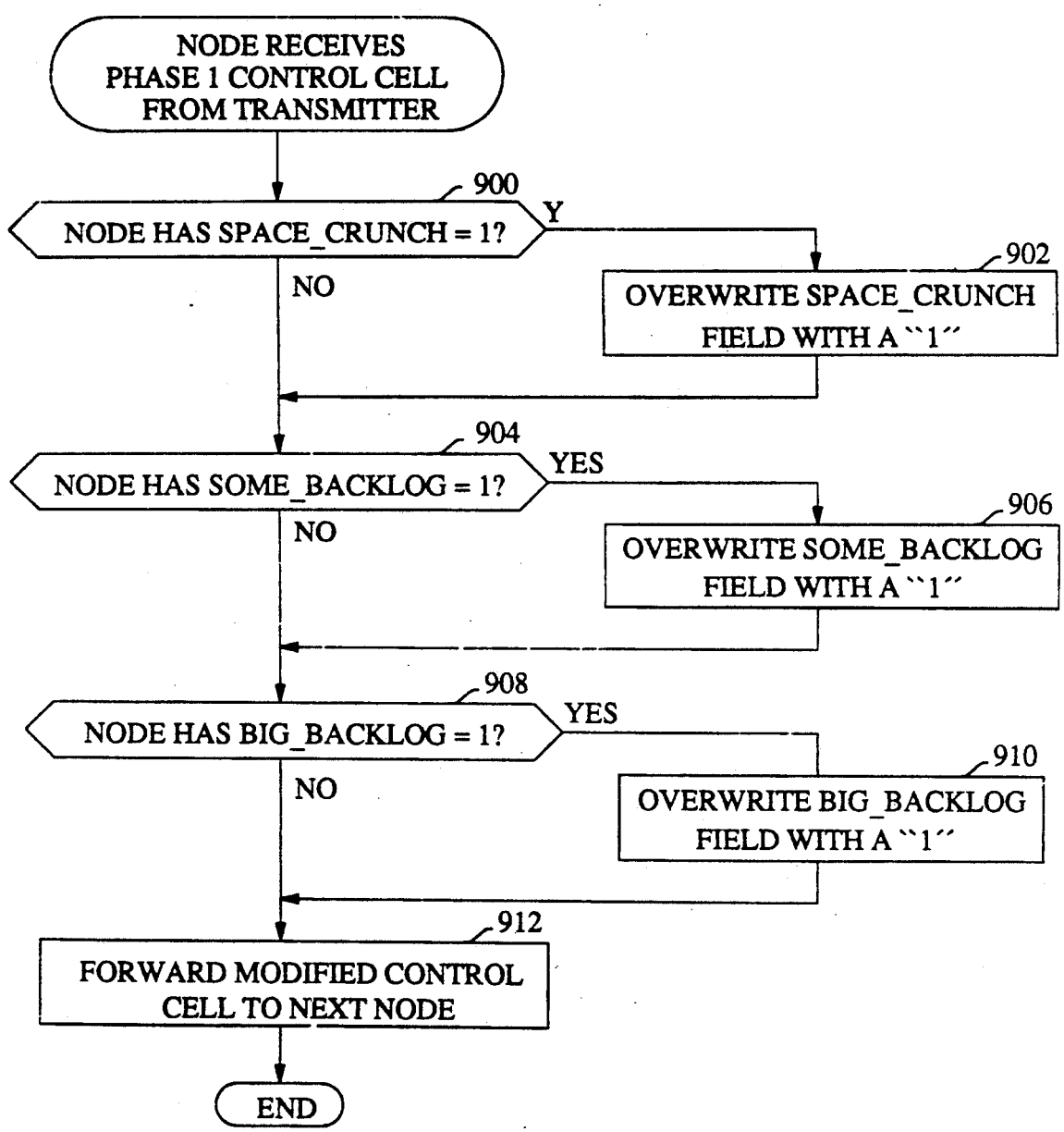
Figure 10:
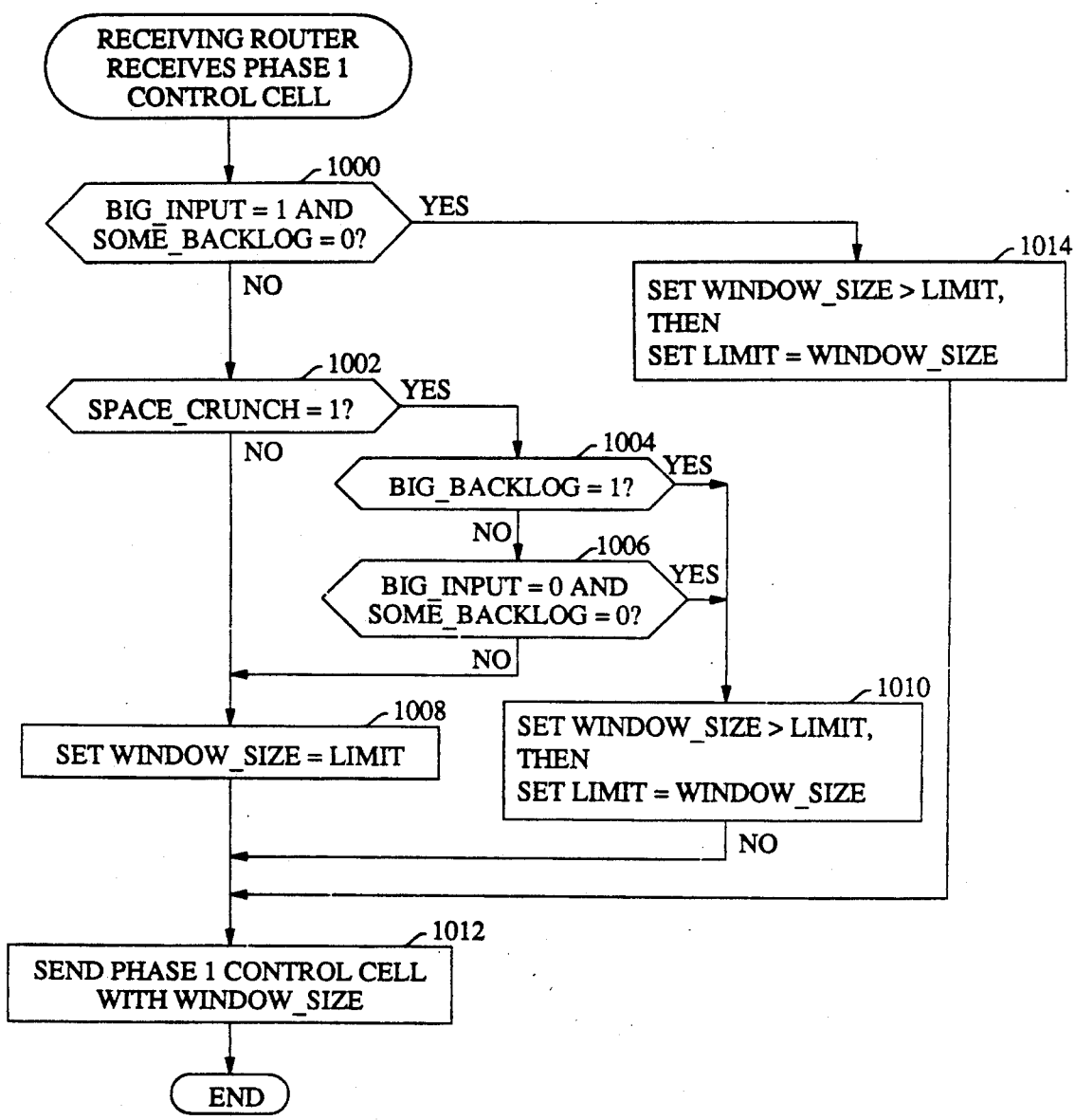
Figure 11:
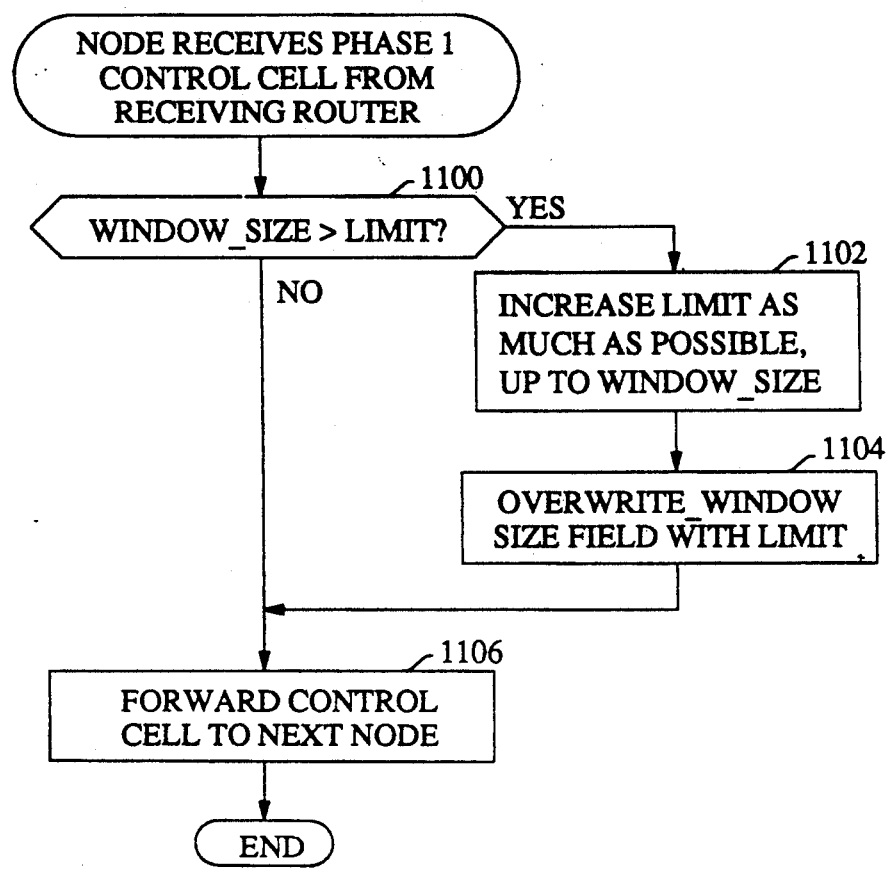
Figure 12:
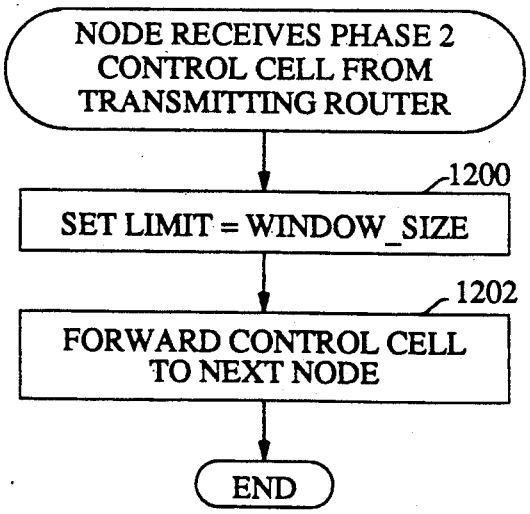

The flow of control for a node controller is shown in FIG. 9. When a node controller receives a Phase 1 control message, it inspects the values of SPACE_CRUNCH (step 900), SOME_BACKLOG (step 904), and BIG_BACKLOG (step 910), and if its own value of the given quantity is 0, it passes that field unchanged. If its own value of the quantity is 1, it writes 1 into the corresponding field, as shown in FIG. 9 (steps 902, 906, 910), before transmitting the control message to the next switching node (step 912).

When the receiving router 120 receives a Phase 1 control message, it first combines its own values of SPACE_CRUNCH, SOME_BACKLOG, and BIG_BACKLOG with the values in the arriving message, just as the switching nodes have done. The receiving router then inspects the last four bits of the modified message and calculates a proposed value of WINDOW_SIZE according to the four cases below, using the logic flow shown in FIG. 10.

(1) If BIG_INPUT=1 and SOME_BACKLOG=0 (step 1000), then increase the window size.

The virtual circuit is nowhere bottlenecked by the round robin scheduler and the virtual circuit would like to send at a faster rate; it is being unnecessarily throttled by its window.

(2) If BIG_BACKLOG=1 and SPACE_CRUNCH=1 (steps 1002, 1004), then reduce the window size.

Some node is bottlenecked by the round robin scheduler and a big buffer has built up there, so the window is unnecessarily big; and some node is running out of space.

(3) If BIG_INPUT=0 and SOME_BACKLOG=0 and SPACE_CRUNCH=1 (step 1006), then reduce the window size.

The virtual circuit has a light offered load, so it does not need a big window to carry the load; and some node is running out of space.

(4) In all other cases (step 1008), the present window size is appropriate.

The receiving router then transmits the Phase 1 control message to the first switching node on the return path (step 1012). The response message contains the fields ORIGIN=1, PHASE=0, WINDOW_SIZE, where the last field is a binary encoding of the recommended window size. Each node controller 212 on the return path looks at the control message and takes the action shown in FIG. 11. If an increased allocation is requested (step 1100), the node makes the allocation if it can (step 1102). If it cannot make the requested allocation, it makes whatever allocation it can make, the minimum being the present buffer size, and writes the allocation it has made into the WINDOW_SIZE field (step 1104). The node then transmits the control message to the next node on the return path (step 1106). If the request is for a decreased allocation, the node does not make the decrease yet, but it passes the WINDOW_SIZE field along unchanged.

When the transmitting router receives the Phase 1 response message (step 804), the WINDOW_SIZE field indicates the window that the virtual circuit is going to have. If there is an increase over the present window size, it is available immediately. If there is a decrease, the transmitting router waits for the amount of unacknowledged data in the virtual circuit to drain down to the new window size, as shown in FIG. 8 at step 806. Then it transmits a Phase 2 control message with the fields ORIGIN=0, PHASE=1, WINDOW_SIZE (step 810). Node controllers receiving this message take the action shown in FIG. 12. They adjust their buffer allocations downward, if necessary, to the value of WINDOW_SIZE (step 1200), and pass the control message along unchanged (step 1202). The receiving router returns a Phase 2 response message with the fields ORIGIN=1, PHASE=1, WINDOW_SIZE. The switching nodes simply pass this message along, since its only purpose is to notify the transmitting router that a consistent set of buffer allocations exists along the entire virtual circuit.

After completing Phase 2, the transmitting router waits for a while, as shown at step 816 in FIG. 8, before beginning Phase 1 again. First it waits until either a window's worth of data has been transmitted since the end of Phase 2 or a certain period of time D, such as 10 to 100 round-trip times, has elapsed since the end of Phase 2, whichever comes first. Then, if the present window size is greater than the minimum window size $B_0$ (step 818) or if BIG_INPUT=1 (step 800), Phase 1 begins immediately; otherwise, Phase 1 begins as soon as BIG_INPUT=1 . A newly opened virtual circuit, whose initial window size and buffer allocations are $B_0$, should begin Phase 1 as soon as BIG_INPUT=1, if ever.

It is to be understood that the above described arrangements are merely illustrative of the application of principles of the invention and that other arrangements may be devised by workers skilled in the art without departing from the spirit and scope of the invention.

We claim:

1. A method employed to control congestion of data cells in switching nodes of a network wherein one or more virtual circuits for transferring the data cells between endpoints pass through one or more of the switching nodes, said method comprising the steps of assigning an initial cell buffer to the virtual circuit at each node through which it passes, storing incoming cells for the virtual circuit in its buffer and removing cells from the buffer for forward routing, characterized by dynamically allocating buffer space for the virtual circuit in the nodes in response to signals from at least one of the endpoints requesting an increased or decreased data window in the nodes.

2. The method of claim 1 wherein the step of assigning an initial buffer further comprises assigning an initial buffer of predetermined size to each virtual circuit.

3. The method of claim 2 wherein the predetermined size of the initial buffer is less than the size of a full data window, wherein a full data window is defined as the product of the maximum transmission bit rate of the virtual circuit multiplied by a nominal factor representing round trip propagation time in the network.

4. The method of claim 1 wherein the step of dynamically allocating buffer space to the virtual circuit further comprises allocating a full data window in response to a signal requesting a larger buffer space, wherein a full data window is defined as the product of the maximum transmission bit rate of the virtual circuit multiplied by a nominal factor representing round trip propagation time in the network.

5. The method of claim 4 further comprising the step of requesting a larger buffer space based on the amount of data waiting to be sent for the said virtual circuit at the cell source.

6. The method of claim 4 wherein the step of dynamically allocating a full data window further comprises determining if sufficient free buffer space exists at each node of the virtual circuit to perform the allocation and denying the request otherwise.

7. The method of claim 1 wherein the step of dynamically allocating buffer space further comprises allocating space to the virtual circuit in one or more blocks of fixed size.

8. The method of claim 1 wherein the step of allocating buffer space further comprises allocating space to the virtual circuit in blocks of variable size.

9. The method of claim 7 or claim 8 further comprising the step of determining the size of a block to be allocated at each node of the virtual circuit based on the amount of data waiting to be sent for the said virtual circuit at the endpoint preceding the first node.

10. The method of claim 9 wherein the step of dynamically allocating buffer space in response to a request for a larger buffer further comprises determining if sufficient free buffer space exists at each node of the virtual circuit to perform the allocation and denying the request otherwise.

11. The method of claim 9 further comprising the step of determining the size of a block to be allocated based on the amount of packet data already buffered for the said virtual circuit at each said node.

12. The method of claim 11 further comprising the step of determining the size of a block to be allocated at each node of the virtual circuit based on the amount of free buffer space at each said node.

13. The method of claim 11 wherein the step of dynamically allocating buffer space in response to a request for a larger buffer further comprises determining if sufficient free buffer space exists at each node of the virtual circuit to perform the allocation and denying the request otherwise.

14. The method of claim 13 wherein the step of determining if sufficient free buffer space exists at each node further comprises transmitting a control message along the virtual circuit from the first node in the circuit to the last node in the circuit, writing information into the control message as it passes through each node describing the amount of free buffer space that can be allocated at the node, and selecting the amount of buffer space assigned to the virtual circuit at each node to be equal to the smallest amount available at any node of the virtual circuit based on the final results in the control message.

15. The method of claim 13 wherein the step of determining if sufficient free buffer space exist at each node further comprises transmitting a control message along the virtual circuit from the first node in the circuit to the last node in the circuit, the control message containing information representing whether a large or small amount of data is buffered at the initial node for the virtual circuit and information representing the availability of free buffer space at the initial node, overwriting said information in the control message with new information as it passes through each node if the new information at a node is more restrictive, and selecting the amount of buffer space assigned to the virtual circuit at each node based on the final results in the control message.

16. The method of claim 14 wherein the step of determining if sufficient free buffer space exists at each node further comprises performing the selecting step at the endpoint following the last node, and returning a second control message from the endpoint following the last node to each node of the virtual circuit, and adjusting the allocation at each node in response to the second control message.

17. The method of claim 14 wherein the step of determining if sufficient free buffer space exists at each node further comprises returning the control message from the endpoint following the last node to the endpoint preceding the first node, performing the selecting step at the endpoint preceding the first node, and transmitting a second control message from the endpoint preceding the first node to each node of the virtual circuit to perform the allocation.

18. The method of claim 2 wherein the size of the initial cell buffer is equal to the size of a full data window divided by the square root of the maximum number of virtual circuits that can simultaneously exist in any node, wherein a full data window is defined as the product of the maximum transmission bit rate of the virtual circuit multiplied by a nominal factor representing round trip propagation time in the network 19. The method of claim 1 or claim 2 or claim 3 or claim 4 or claim 7 or claim 8 further comprising the step of discarding data for the virtual circuit during buffer overflow for the said virtual circuit.

20. The method of claim 1 or claim 2 or claim 3 or claim 4 or claim 7 or claim 8 further comprising the step of requesting a reduction in the allocated buffer space for the virtual circuit after a prior increase of the buffer space above the initial buffer space based on the amount of data waiting to be sent for the said virtual circuit at the endpoint preceding the first node.

21. The method of claim 20 wherein the step of requesting a reduction in the allocated buffer space for the virtual circuit after a prior increase of the buffer space above the initial buffer space is further based on the amount of data already buffered for the said virtual circuit at each said node.

22. The method of claim 21 wherein the step of requesting a reduction in the allocated buffer space for the virtual circuit after a prior increase of the buffer space above the initial buffer space is further based on the amount of free buffer space at each said node.

23. The method of claim 1 wherein the step of dynamically allocating buffer space further comprises
    transmitting a control message along the virtual circuit from the first node in the circuit to the last node in the circuit,
    writing information into the control message as it passes through each node describing the amount of free buffer space that can be allocated at the node, and
    selecting the amount of buffer space assigned to the virtual circuit at each node to be no more than the smallest amount available at any node of the virtual circuit based on the final results in the control message.

24. The method of claim 23 wherein the step of dynamically allocating buffer space further comprises
    performing the selecting step at the endpoint following the last node, and
    returning a second control message from the endpoint following the last node through each node of the virtual circuit, and
    adjusting the allocation at each node in response to the second control message.

25. The method of claim 24 wherein the step of dynamically allocating buffer space at each node further comprises
    returning the control message from the endpoint following the last node to the endpoint preceding the first node,
    performing the selecting step at the endpoint preceding the first node, and
    transmitting a second control message from the endpoint preceding the first node to each node of the virtual circuit to perform the allocation.

26. A method employed to control congestion of data cells in switching nodes of a network wherein one or more virtual circuits for transferring the data cells between endpoints pass through one or more of the switching nodes, each switching node including a cell buffer for each virtual circuit passing therethrough and said method comprising the steps of:
    for the duration of the virtual circuit, performing steps including
    determining at an endpoint whether a different-sized cell buffer is needed for the virtual circuit in the virtual circuit's switching nodes;
    if a different-sized cell buffer is needed, providing a first resizing signal from the endpoint to the virtual circuit's switching nodes;
    in each of the virtual circuit's nodes, responding to the first resizing signal by indicating the cell buffer size which the node can provide if that is less than the different size; and
    in each node of the virtual circuit, setting the cell buffer for the virtual circuit to a buffer size which is no greater than the smallest buffer size indicated by any of the switching nodes.

* * * * *